(12) United States Patent
Manabe

(10) Patent No.: US 9,165,164 B2
(45) Date of Patent: Oct. 20, 2015

(54) CRYPTOGRAPHIC PROCESSING APPARATUS AND METHOD FOR STORAGE MEDIUM

(75) Inventor: Masao Manabe, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 536 days.

(21) Appl. No.: 12/662,065

(22) Filed: Mar. 30, 2010

(65) Prior Publication Data

US 2010/0275035 A1    Oct. 28, 2010

(30) Foreign Application Priority Data

Apr. 27, 2009  (JP) ................................. 2009-107348

(51) Int. Cl.
| | |
|---|---|
| G06F 12/14 | (2006.01) |
| G06F 21/78 | (2013.01) |
| G09C 1/00 | (2006.01) |
| G06F 21/80 | (2013.01) |
| G06F 21/85 | (2013.01) |

(52) U.S. Cl.
CPC ................ *G06F 21/78* (2013.01); *G06F 21/80* (2013.01); *G06F 21/85* (2013.01); *G09C 1/00* (2013.01); *G06F 2221/2107* (2013.01)

(58) Field of Classification Search
CPC ......... G06F 12/14; G06F 21/72; G06F 21/10; G06F 2221/2107
USPC .......................................... 713/193, 189, 162
See application file for complete search history.

(56) References Cited

U.S. PATENT DOCUMENTS

| | | | | |
|---|---|---|---|---|
| 5,872,905 | A | * | 2/1999 | Ono et al. ........................ 714/5.1 |
| 6,122,379 | A | * | 9/2000 | Barbir ............................ 380/269 |
| 8,571,221 | B2 | * | 10/2013 | Little et al. .................... 380/264 |
| 2003/0065925 | A1 | | 4/2003 | Shindo et al. |
| 2004/0172538 | A1 | | 9/2004 | Satoh et al. |
| 2007/0058806 | A1 | * | 3/2007 | Ferguson ........................ 380/42 |
| 2008/0130868 | A1 | | 6/2008 | Ueno |
| 2010/0058476 | A1 | * | 3/2010 | Isoda .............................. 726/26 |

FOREIGN PATENT DOCUMENTS

| | | |
|---|---|---|
| CN | 1508698 A | 6/2004 |
| JP | 10-508450 A | 8/1998 |
| JP | 2003-115830 A | 4/2003 |
| JP | 2008-141284 | 6/2008 |

(Continued)

OTHER PUBLICATIONS

Chinese Office Action dated May 28, 2013, with English-language translation.

(Continued)

*Primary Examiner* — Ali Abyaneh
(74) *Attorney, Agent, or Firm* — Mcginn IP Law Group, PLLC

(57) ABSTRACT

Provided is a cryptographic processing apparatus for a storage medium, including: a location information conversion unit that stores a conversion result in a buffer, the conversion result obtained by performing a conversion process on location information indicating a location of data to be accessed on the storage medium; and a data cryptographic processing unit that performs cryptography processing on the data using the conversion result stored in the buffer, the cryptography processing being one of encryption and decryption.

17 Claims, 12 Drawing Sheets

(56) References Cited

FOREIGN PATENT DOCUMENTS

| WO | WO 96/33564 A1 | 10/1996 |
| WO | WO 2006/118171 A1 | 11/2006 |

OTHER PUBLICATIONS

Japanese Notification of Reasons for Refusal dated Aug. 27, 2013.
Chinese Notification of the Second Office Action dated Nov. 18, 2013 with English translation thereof.
Chinese Office Action dated May 20, 2014, with English translation.
Chinese Office Action dated Dec. 1, 2014 with an English Translation thereof.
Chinese Office Action dated Jun. 5, 2015 with English Translation.

* cited by examiner

STORAGE MEDIUM ACCESS PROCESSING TIME

CRYPTOGRAPHIC PROCESSING APPARATUS AND METHOD FOR STORAGE MEDIUM

INCORPORATION BY REFERENCE

This application is based upon and claims the benefit of priority from Japanese patent application No. 2009-107348, filed on Apr. 27, 2009, the disclosure of which is incorporated herein in its entirety by reference.

BACKGROUND

1. Field of the Invention

The present invention relates to a cryptographic processing apparatus and a method and in particular to a cryptographic processing apparatus and a method that perform cryptography processing, namely, encryption or decryption on data to be accessed, based on information indicating the location of the data on a storage medium (location information).

2. Description of Related Art

In recent years, there has been increased the need to manage data on a storage medium such as a hard disk drive (HDD) or flash memory by performing cryptography processing, namely, encryption or decryption on the data. Advanced encryption standard (AES)-XTS is becoming a standard cryptographic processing method for such storage media. In AES-XTS, AES encryption is performed on the sector number for identifying the location of data to be accessed on the disk of the storage medium. Then, the data is AES-encrypted or AES-decrypted using the AES-encrypted sector number. Thus, even if pieces of data having the same contents appear at different sector numbers, the encryption results of the pieces of data can differ from each other.

Japanese Unexamined Patent Application Publication No. 2008-141284 discloses technology on a magnetic storage device that encrypts the sector number and uses the encrypted sector number to encrypt data. A magnetic storage device according to Japanese Unexamined Patent Application Publication No. 2008-141284 includes a scrambler including a shift register composed of multiple stages and an exclusive OR circuit. The exclusive OR circuit obtains an exclusive OR of logic of a stage of the shift register corresponding to one generator polynomial. The scrambler is configured so that the output of the exclusive OR circuit is fed back to the first stage of the shift register. The binary-coded number or the like of the sector number is set as the initial value for the shift register composed of multiple stages.

SUMMARY

FIG. 12 is a diagram showing an example data flow in a cryptographic processing apparatus 800 according to AES-XTS. More specifically, FIG. 12 shows a data flow in a case where data is encrypted. The cryptographic processing apparatus 800 includes an AES cryptographic processing circuit 3, a multiplication circuit 4, an exclusive OR circuit 5, an AES cryptographic processing circuit 6, and an exclusive OR circuit 7.

First, the AES cryptographic processing circuit 3 receives a sector number 30 corresponding to data to be encrypted and a key 31. Then, the AES cryptographic processing circuit 3 outputs the result of the AES encryption process to the multiplication circuit 4. The multiplication circuit 4 multiplies the encryption result received from the AES cryptographic processing circuit 3 by a polynomial coefficient 41 and outputs the conversion result. Then, the exclusive OR circuit 5 performs an exclusive OR operation on a plaintext block 51 of the data to be encrypted and the conversion result received from the multiplication circuit 4 and outputs the operation result to the AES cryptographic processing circuit 6. The AES cryptographic processing circuit 6 receives the operation result outputted from the exclusive OR circuit 5 and a key 61. Then, the AES cryptographic processing circuit 6 performs an AES encryption process and outputs the encryption result to the exclusive OR circuit 7. Then, the exclusive OR circuit 7 performs an exclusive OR operation on the encryption result received from the AES cryptographic processing circuit 6 and the conversion result received from the multiplication circuit 4 and outputs a cipher block 71.

The above-mentioned AES-XTS and Japanese Unexamined Patent Application Publication No. 2008-14.1284 perform the storage medium access process using the encryption result of the sector number or the like, enabling an increase in security strength. These related-art examples, however, disadvantageously delay the storage medium access processing time. This is because, each time data to be accessed is subjected to cryptography processing, namely, encryption or decryption, the sector number of the data must be encrypted. For example, in a case where data is stored in an HDD, the access process is started after the header is moved to the location of the sector number of the storage destination on the disk. In this case, first, the sector number encryption process is performed. Then, the data encryption process is started. Upon completion of the data encryption process, the cipher block 71 is stored on the disk.

FIG. 13 is a diagram showing the concept of the storage medium access processing time in a case where a single access process extends over three sector numbers. First, an AES process SA1 is performed on the first sector number and then an AES process DA1 is performed on the first data. Subsequently, an AES process SA2 is performed on the second sector number and then an AES process DA2 is performed on the second data. Subsequently, an AES process SA3 is performed on the third sector number and then an AES process DA3 is performed on the third data.

A first exemplary aspect of an embodiment of the present invention is a cryptographic processing apparatus for storage medium. The cryptographic processing apparatus includes a location information conversion unit that stores a conversion result in a buffer, the conversion result obtained by performing a conversion process on location information indicating a location of data to be accessed on the storage medium; and a data cryptographic processing unit that performs cryptography processing on the data using the conversion result stored in the buffer, the cryptography processing being one of encryption and decryption.

A second exemplary aspect of an embodiment of the present invention is a cryptographic processing method for storage medium. The cryptographic processing method includes storing a conversion result in a buffer, the conversion result obtained by performing a conversion process on location information indicating a location of data to be accessed on the storage medium; and performing cryptography processing on the data using the conversion result stored in the buffer, the cryptography processing being one of encryption and decryption.

In the cryptographic processing apparatus and method for storage medium according to the above-mentioned first and second aspects of the present invention, the conversion processes of location information such as the sector numbers are performed independently of the cryptography processes of data and the conversion results are stored in the buffer. Then, the data cryptography processes are performed while obtaining the conversion results from the buffer. In other words, each time a cryptography process is performed on data to be accessed, a conversion process does not need to be performed on location information of the data. This can reduce the data cryptographic time.

The present invention provides a cryptographic processing apparatus and a method for storage medium that increase the performance of the storage medium access process involving cryptography processing.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
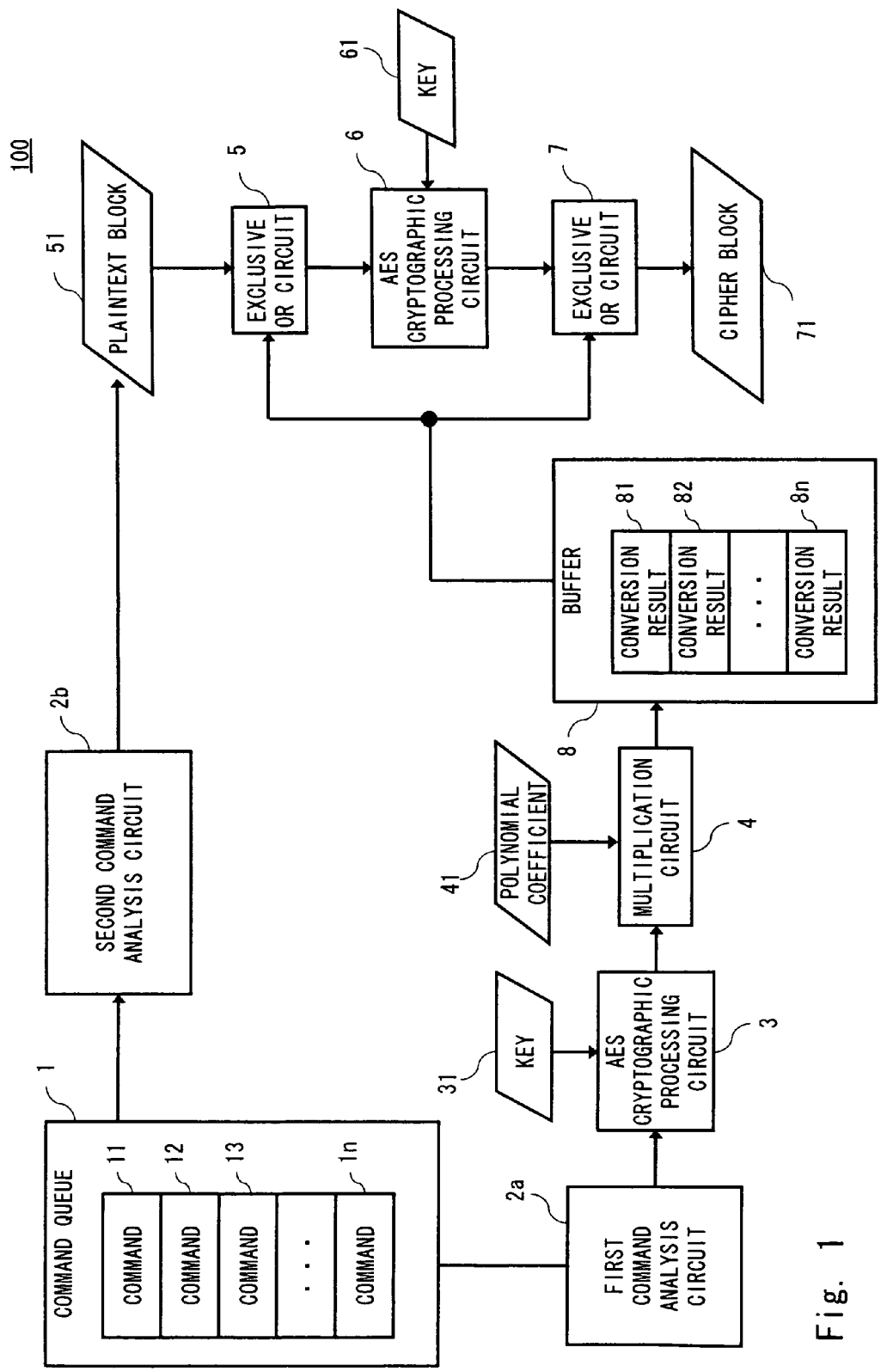
FIG. 1 is a block diagram showing a configuration of a cryptographic processing apparatus 100 according to a first embodiment of the present invention.

Hereinafter, specific embodiments to which the present invention is applied will be described in detail with reference to the accompanying drawings. In the drawings, the same components are denoted by the same reference symbols, and a redundant explanation thereof is omitted as appropriate to clarify the explanation.

First Exemplary Embodiment

FIG. 1 is a block diagram showing a configuration of a cryptographic processing apparatus 100 according to a first embodiment of the present invention. The cryptographic processing apparatus 100 includes a storage medium (not shown) such an HDD or flash memory. The computer program 100 performs cryptography processing, namely, encryption or decryption on data to be accessed, based on information indicating the location of the data on the storage medium. The cryptographic processing apparatus 100 is connected to an external apparatus (not shown) such as a central processing unit (CPU) via a predetermined communication interface. The cryptographic processing apparatus 100 receives a command for access to the storage medium, from the external apparatus. Then, the cryptographic processing apparatus 100 performs a storage medium access process and sends the access result to the external apparatus. In this case, the cryptographic processing apparatus 100 performs cryptography processing in accordance with the access command, before writing data onto the storage medium or after reading data from the storage medium.

The access command contains a command code indicating the type of the command, a sector number, which is information indicating the location of data to be accessed on the storage medium, and the number of sectors. The command code is, for example, a write request or read request. The sector number is, for example, LBA (logical block addressing), but not limited thereto. With a single access command, multiple, continuous sector numbers may be accessed. In this case, the top of the sector numbers to be accessed is used as the sector number of the access command. The number of sectors is the number of sectors following the top of the sector numbers to be accessed. The location information contained in the access command is not limited to the sector number and the number of sectors. The location information contained in the access command may contain multiple sector numbers to be accessed. Alternatively, the location information may be information indicating the start and end locations of data to be accessed. That is, the location information is information by which at least the storage destination of data on the storage medium can be identified uniquely.

For example, if the access command is a write request, the cryptographic processing apparatus 100 receives a plaintext block 51, which is a data block to be written corresponding to the access command, along with the access command. Then, the storage medium encryption processing apparatus 100 performs an encryption process on the plaintext block 51 and stores the encryption result in the location corresponding to the sector number on the storage medium. Subsequently, the cryptographic processing apparatus 100 provides notification of the completion of the storage to the external apparatus, the requester, as a response.

If the access command is a read request, the cryptographic processing apparatus 100 reads, from the storage medium, the cipher block 71 stored in the sector number corresponding to the access command. Then, the cryptographic processing apparatus 100 performs a decryption process on the read cipher block 71 to generate the plaintext block 51. The cryptographic processing apparatus 100 then sends the generated plaintext block 51 to the external apparatus, the requester, as a response. Hereafter, a case where the access command is a write request, that is, a case where the cryptographic processing apparatus 100 performs an encryption process on the plaintext block 51 will be described and a case where it performs a decryption process will not be described in detail.

The cryptographic processing apparatus 100 includes a command queue 1, a first command analysis circuit 2a for processing sector numbers, a second command analysis circuit 2b, the AES cryptographic processing circuit 3, the multiplication circuit 4, the exclusive OR circuit 5, the AES cryptographic processing circuit 6, the exclusive OR circuit 7, and a buffer 8.

The command queue 1 is a storage area that manages multiple access commands from the external apparatus using the first-in first-out (FIFO) method. Here, it is assumed that the command queue 1 stores the received multiple access commands in the order of a command 11, a command 12, a command 13, . . . and a command 1*n*. Preferably, the cryptographic processing apparatus 100 determines the processing order of multiple access commands received from the external apparatus within a predetermined time so that the moving distance of the header to the storage medium is minimized, regardless of what order the access commands have been received in. In this case, the cryptographic processing apparatus 100 stores the multiple access commands in the command queue 1 while rearranging them in the determined processing order. Execution of the access commands thus stored in the processing order can speed up the HDD access process. Preferably, the cryptographic processing apparatus 100 determines the processing order of the multiple access commands received with the predetermined time according to the native command queuing (NCQ) method, but not limited thereto. For example, the cryptographic processing apparatus 100 may store the access commands in the command queue 1 while rearranging them in any processing order. Alternatively, the cryptographic processing apparatus 100 may store the multiple access commands in the command queue 1 in the order in which they have been received.

The first command analysis circuit 2*a* is an electronic circuit that reads the access commands from the command queue 1 in the processing order and analyzes the read access commands. Specifically, the first command analysis circuit 2*a* reads the access commands in the order of the command 11, command 12, command 13, . . . and command 1*n*. Then, the first command analysis circuit 2*a* analyzes each read access command to extract a sector number to be accessed and outputs the extracted sector number to the AES cryptographic processing circuit 3.

The AES cryptographic processing circuit 3 performs an AES encryption process on each sector number received from the first command analysis circuit 2*a*, using the key 31. Then, the AES cryptographic processing circuit 3 outputs the result of the AES encryption process to the multiplication circuit 4. The AES encryption process is known and will not be described in detail. The multiplication circuit 4 multiplies each encryption result received from the AES cryptographic processing circuit 3 by a polynomial coefficient 41 and stores the conversion result in the buffer 8.

The buffer 8 is a storage area for storing the result of the conversion process performed by the AES cryptographic processing circuit 3 and multiplication circuit 4 on each sector number. The buffer 8 stores a conversion result 81, a conversion result 82, . . . and a conversion result 8*n* associated with the command 11, command 12, command 13, . . . and command 1 *n*, respectively.

As seen, the first command analysis circuit 2*a*, AES cryptographic processing circuit 3, and multiplication circuit 4 constitute a location information conversion unit that performs a conversion process on each sector number, which is location information, and stores the conversion result in the buffer 8.

The second command analysis circuit 2*b* is an electronic circuit that reads the access commands from the command queue 1 in the processing order and analyzes the read access commands. Note that the second command analysis circuit 2*b* reads the access commands from the command queue 1 independently of reading of the access commands by the first command analysis circuit 2*a*. For example, even if the command 11 has been read by the first command analysis circuit 2*a*, the second command analysis circuit 2*b* reads the command 11, command 12, command 13, . . . and command 1 *n* in the order presented while considering the command 11 to be unprocessed. The second command analysis circuit 2*b* then analyzes each read access command to obtain data to be accessed, that is, a data block to be stored in the storage medium and outputs the data block as the plaintext block 51.

The exclusive OR circuit 5 reads, from the buffer 8, a conversion result associated with an access command corresponding to a specific plaintext block 51. Then, the exclusive OR circuit 5 performs an exclusive OR operation on the plaintext block 51 and the read conversion result and outputs the operation result to the AES cryptographic processing circuit 6. The AES cryptographic processing circuit 6 receives the operation result outputted by the exclusive OR circuit 5 and the key 61. Then, the AES cryptographic processing circuit 6 performs an AES encryption process and outputs the encryption result to the exclusive OR circuit 7. Then, the exclusive OR circuit 7 performs an exclusive OR operation on the encryption result received from the AES cryptographic processing circuit 6 and the conversion result read from the exclusive OR circuit 5 by the exclusive OR circuit 5 and outputs the operation result to the cipher block 71.

If the access command is a read request, the exclusive OR circuit 7 performs an exclusive OR operation on the cipher block 71 and the conversion result read from the buffer 8 and outputs the operation result to the AES cryptographic processing circuit 6. The AES cryptographic processing circuit 6 receives the operation result outputted by the exclusive OR circuit 7 and the key 61. Then, the AES cryptographic processing circuit 6 performs an AES decryption process and outputs the decryption result to the exclusive OR circuit 5. The exclusive OR circuit performs an exclusive OR operation on the decryption result received from the AES cryptographic processing circuit 6 and the conversion result read from the buffer 8 and outputs the plaintext block 51.

As seen, the second command analysis circuit 2*b*, exclusive OR circuit 5, AES cryptographic processing circuit 6, and exclusive OR circuit 7 constitute a data cryptographic processing unit that, using the conversion result stored in the buffer 8, performs cryptography processing on the plaintext block 51 corresponding to the conversion result. As for a decryption process, the second command analysis circuit 2*b* reads data corresponding to a sector number from the storage medium as a cipher block 71. Then, in FIG. 1, the read cipher block 71 is processed by the exclusive OR circuit 7, AES cryptographic processing circuit 6, and exclusive OR circuit 5 in the order presented so as to be decrypted into the plaintext block 51.

Figure 2:
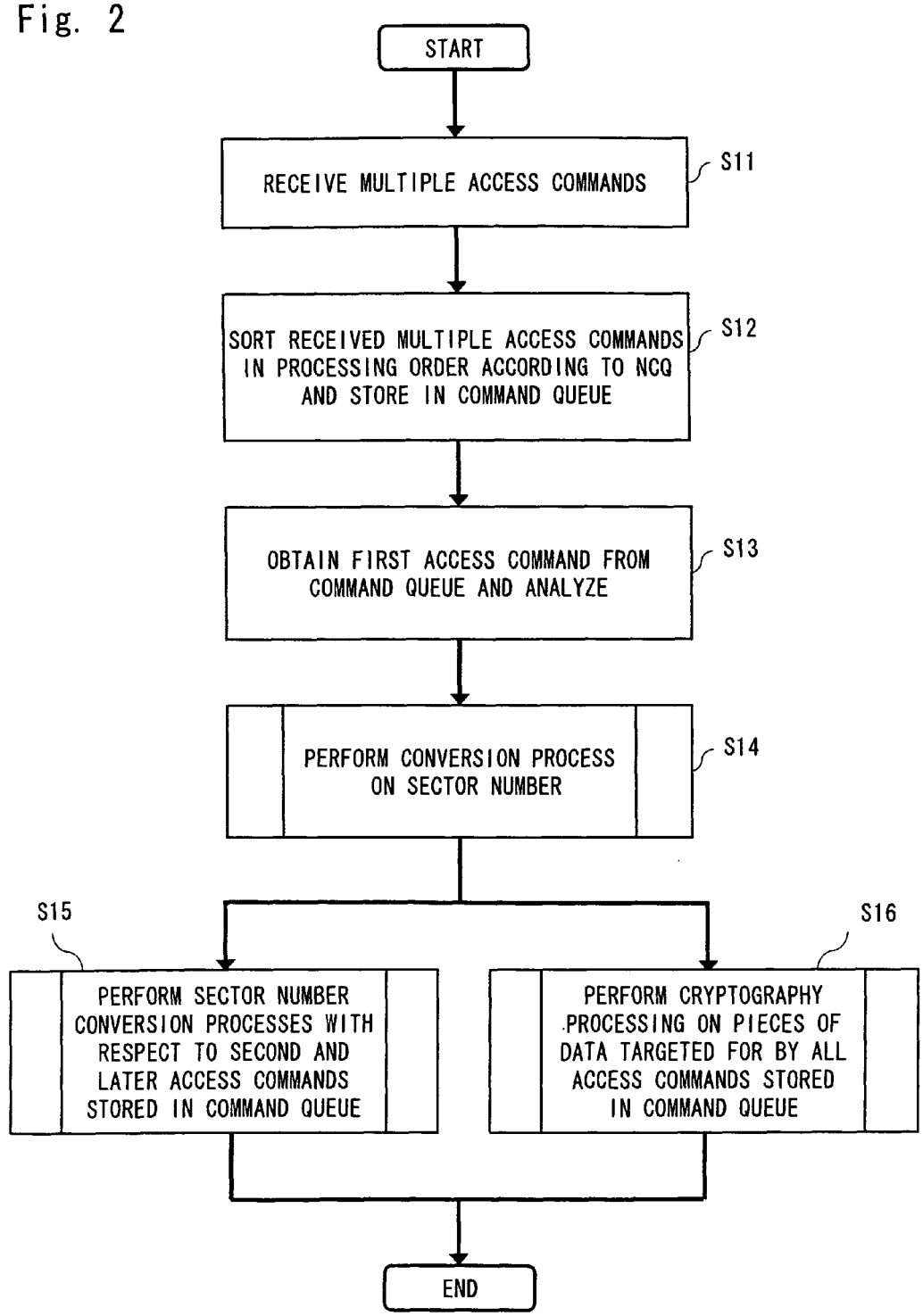
FIG. 2 is a flowchart showing the flow of the storage medium access process according to the first embodiment.

FIG. 2 is a flowchart showing the flow of the storage medium access process according to the first embodiment. First, the cryptographic processing apparatus 100 receives multiple access commands (S11). Next, the cryptographic processing apparatus 100 sorts the received multiple access commands in the processing order according to NCQ and stores them in the command queue 1 (S12).

Then, the first command analysis circuit 2*a* obtains the first access command, the command 11, from the command queue 1 and analyzes it (S13). Through the analysis, the first command analysis circuit 2*a* extracts a sector number contained in the command 11. Then, the first command analysis circuit 2*a* outputs the extracted sector number to the AES cryptographic processing circuit 3.

Figure 3:
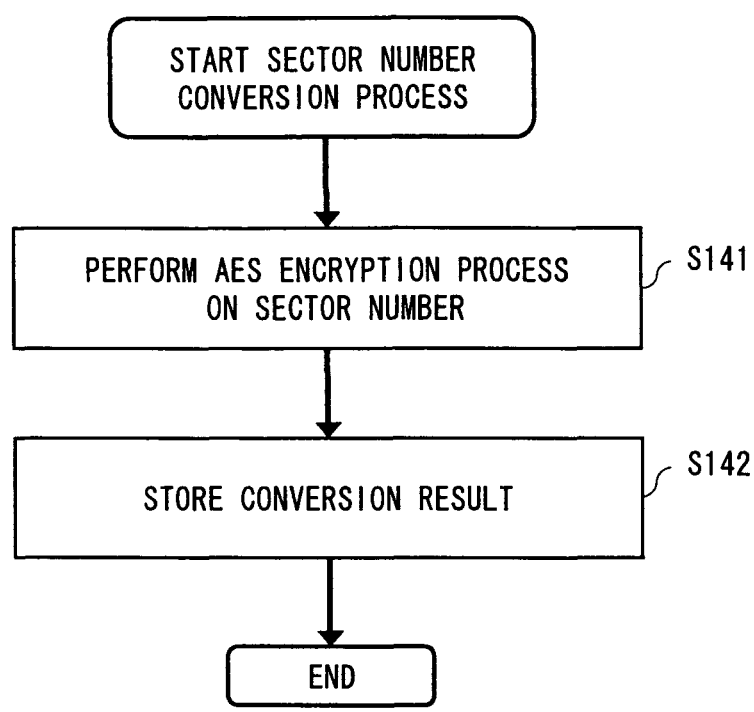
FIG. 3 is a flowchart showing the flow of the sector number conversion process according to the first embodiment.

Subsequently, the AES cryptographic processing circuit 3 performs a conversion process on the sector number (S14). FIG. 3 is a flowchart showing the flow of the sector number conversion process according to the first embodiment. First, as described above, the AES cryptographic processing circuit 3 performs an AES encryption process on the sector number received from the first command analysis circuit 2*a*, using the key 31 (S141). Then, the AES cryptographic processing circuit 3 outputs the result of the AES encryption process to the multiplication circuit 4. The multiplication circuit 4 multiplies the encryption result received from the AES cryptographic processing circuit 3 by the polynomial coefficient 41 and stores the conversion result 81 in the buffer 8 (S142).

Referring back to FIG. 2, the cryptographic processing apparatus 100 performs steps S15 and S16 simultaneously. Specifically, the first command analysis circuit 2a, AES cryptographic processing circuit 3, and multiplication circuit 4 perform sector number conversion processes with respect to the second and later access commands stored in the command queue 1 (S15). Details of the process of step S15 will be described referring to FIG. 4. On the other hand, the second command analysis circuit 2b, exclusive OR circuit 5, AES cryptographic processing circuit 6, and exclusive OR circuit 7 perform cryptography processing on pieces of data targeted for by all access commands stored in the command queue 1 (S16). Details of the process of step S16 will be described referring to FIG. 5. When steps S15 and S16 are both completed, the cryptographic processing apparatus 100 completes the storage medium access process.

Figure 4:
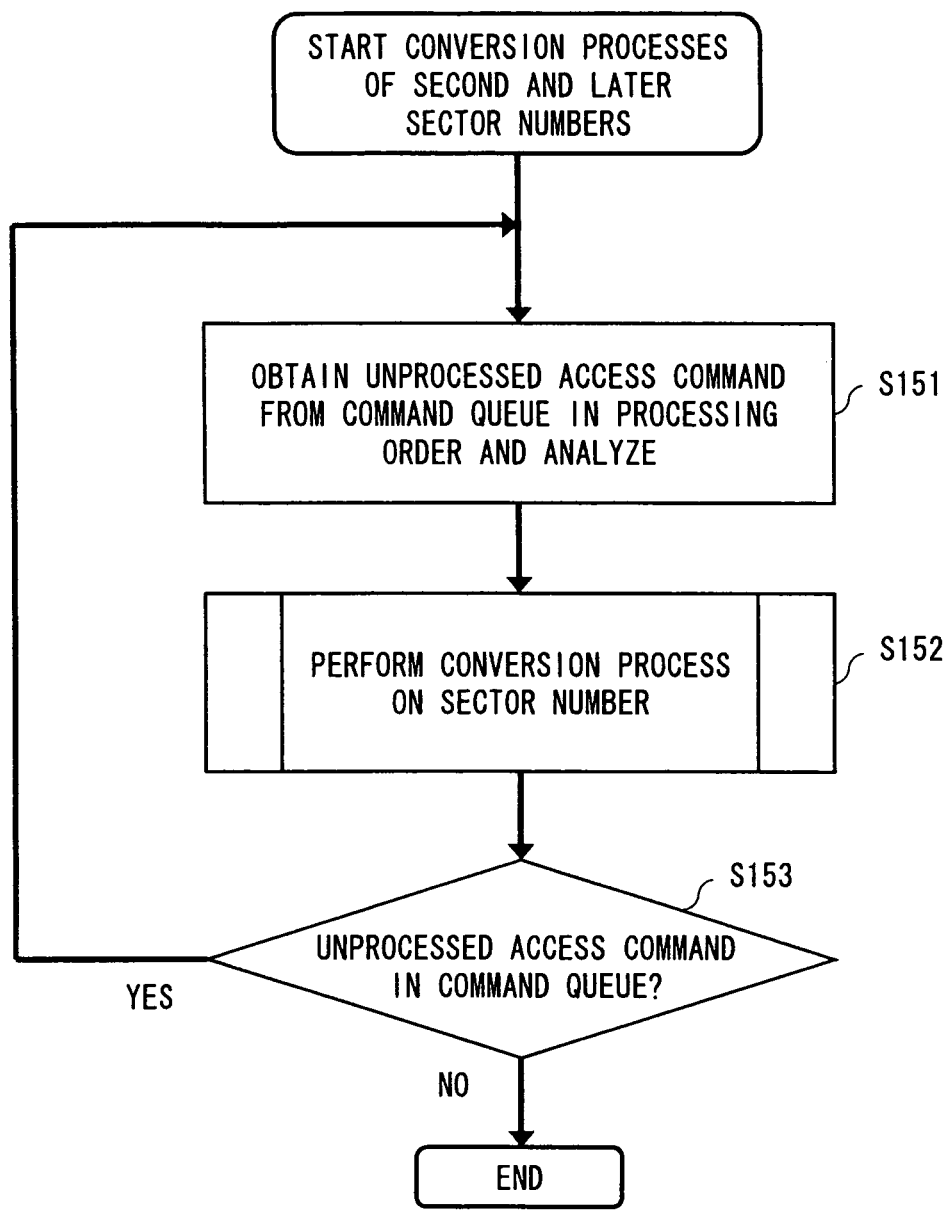
FIG. 4 is a flowchart showing the flow of the conversion processes of the second and later sector numbers according to the first embodiment.

FIG. 4 is a flowchart showing the flow of the conversion processes of the second and later sector numbers according to the first embodiment. First, the first command analysis circuit 2a obtains an unprocessed access command from the command queue 1 in the processing order and analyzes it (S151). Since the command 11 has been processed in steps S13 and S14, the first command analysis circuit 2a obtains the command 12. Then, the first command analysis circuit 2a analyzes the command 12 to extract a sector number contained therein.

Subsequently, the AES cryptographic processing circuit 3 and multiplication circuit 4 perform a conversion process on the sector number (S152). Here, the AES cryptographic processing circuit 3 and multiplication circuit 4 perform the same process as that of step S14. Then, the multiplication circuit 4 stores the conversion result 82 in the buffer 8.

Subsequently, the first command analysis circuit 2a determines whether there is an unprocessed access command in the command queue 1 (S153). If it is determined that there is an unprocessed access command, the process proceeds to step S151. Then, the first command analysis circuit 2a obtains the commands 13 to 1n from the command queue 1 and repeats the processes of steps S151 to S153 with respect thereto. If it is determined in step S153 that there is no unprocessed access command, the cryptographic processing apparatus 100 completes the sector number conversion process.

Figure 5:
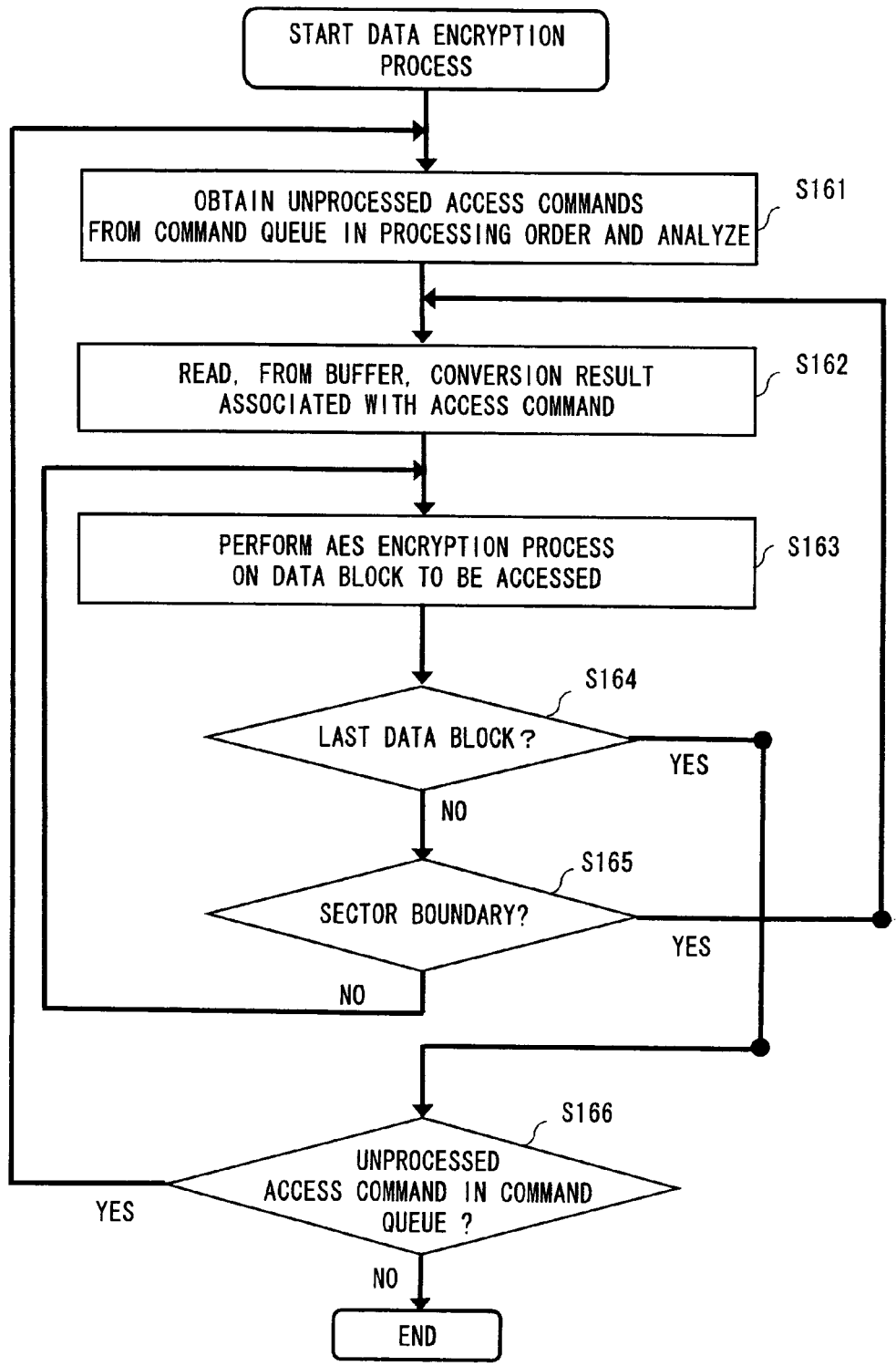
FIG. 5 is a flowchart showing the flow of the data encryption process according to the first embodiment.

FIG. 5 is a flowchart showing the flow of the data encryption process according to the first embodiment. First, the second command analysis circuit 2b obtains unprocessed access commands from the command queue 1 in the processing order and analyzes them (S161). As described above, even if these access commands have been processed by the first command analysis circuit 2a, the second command analysis circuit 2b determines that the access commands are unprocessed. First, the second command analysis circuit 2b obtains the command 11. Then, the second command analysis circuit 2b analyzes the command 11 to obtain a data block to be stored in the storage medium and outputs the data block as the plaintext block 51.

Subsequently, the exclusive OR circuit 5 reads, from the buffer 8, the conversion result associated with the access command corresponding to the plaintext block 51 (S162). That is, the exclusive OR circuit 5 reads the conversion result 81 associated with the command 11, from the buffer 8. Then, the exclusive OR circuit 5, AES cryptographic processing circuit 6, and exclusive OR circuit 7 perform an AES encryption process on the data block to be accessed (S163). That is, as described above, the exclusive OR circuit 5, AES cryptographic processing circuit 6, and exclusive OR circuit 7 perform data cryptography processing on the plaintext block 51 using the conversion result 81 and key 61.

Subsequently, the second command analysis circuit 2b determines whether the data clock processed immediately before is the last data block (S164). That is, the second command analysis circuit 2b determines whether data cryptography processing on the access commands to be processed has been completed. For example, the second command analysis circuit 2b determines whether the data block of the command 11 is the last one of the data blocks to be accessed. If it is determined in step S164 that the data block processed immediately before is not the last one, the second command analysis circuit 2b determines whether the data block is a sector boundary (S165). That is, the second command analysis circuit 2b determines whether data cryptography processing on data blocks corresponding to the same sector number of the access commands to be processed has been completed. For example, the second command analysis circuit 2b determines whether the data block processed immediately before is the last one of the data blocks corresponding to the same sector number. If it is determined in step S165 that the data block is not a sector boundary, the process returns to step S163. Thereafter, steps S163 to S165 are repeated until data cryptography processing on the last one of the data blocks corresponding to the sector number is completed. If it is determined in step S165 that the data block is a sector boundary, the process returns to step S162. Thereafter, steps S162 to S165 are repeated until data blocks corresponding to the last sector number of the access commands to be processed is subjected to data cryptography processing. If it is determined in step S164 that the data block is the last one, the process proceeds to step S166.

Subsequently, the second command analysis circuit 2b determines whether there is an unprocessed access command in the command queue 1 (S166). If it is determined that there is an unprocessed access command, the process returns to step S161. Then, the second command analysis circuit 2b obtains the commands 12 to 1n from the command queue 1 and repeats the processes of steps S161 to S166 with respect thereto. If it is determined in step S166 that there is no unprocessed access command, the data cryptography processing is completed.

As seen, at latest before the data cryptographic processing unit completes cryptography processing on the first data corresponding to the command 11, the location information conversion unit starts a conversion process on location information corresponding to the second data, which is to be processed after the first data and corresponds to the command 12. In other words, a conversion process is started on the location information of the second data without waiting until the encryption process on the first data is completed; therefore, the data cryptographic processing unit can start an encryption process on the second data upon completion of the cryptography processing on the first data without any interval.

More preferably, the location information conversion unit starts a conversion process on location information corresponding to the second data while the data cryptographic processing unit performs cryptography processing on the first data. This allows simultaneously performing the location information conversion process and the data encryption process, thereby speeding up the access process.

Figure 12:
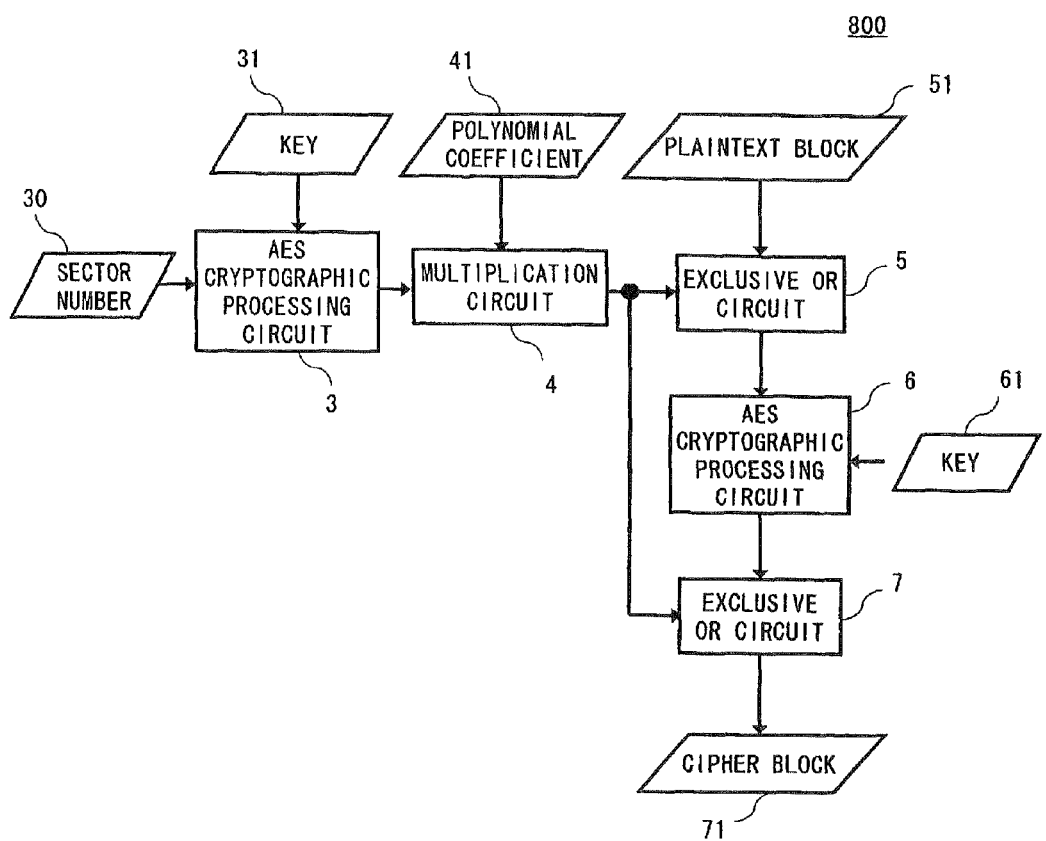
FIG. 12 is a diagram showing a data flow according to AES-XTS to a related art.

As for the above-mentioned data flow shown in FIG. 12, a sector number encryption process occurs each time the sector number is changed. The overhead of such changes disadvantageously reduces the processing efficiency. In other words, the AES cryptographic processing circuit according to the related art cannot grasp the number of sectors before the access process is actually started. For this reason, each time it is determined that the data block is a sector boundary, the AES cryptographic processing circuit according to the related art must extract a sector number to be accessed and perform an AES encryption process on the extracted sector number.

With regard to the speed of input and output between the storage medium and external apparatus, the physical access process that the drive or the like inside the storage medium performs has been a bottleneck, since the processing speed of the communication interface has been increased in recent years. A variation in performance of such a physical access process affects the overall input and output time.

On the other hand, the data cryptographic processing unit according to the first embodiment reads the conversion result, namely, the encrypted sector number from the buffer 8 in step S162 of FIG. 5. Accordingly, processing efficiency is higher than that in a case where an encryption process is performed on the sector number at this point. For example, assume that one sector is 512 bytes and that one sector number corresponds to 32 data blocks. In performing AES encryption processes corresponding to one sector, the data cryptographic processing unit according to the related art must perform 33 AES encryption processes; the data cryptographic processing unit according to the first embodiment can reduce the number of AES encryption processes to 32, since an AES encryption process on the sector number is excluded. As described above, a variation in performance of the access process affects the overall input and output time; therefore, an increase in such performance is effective.

If the access command is an access command targeted for multiple, continuous sector numbers, the location information conversion unit preferably corrects location information in accordance with the length of the data to be accessed, performs a conversion process on the corrected location information, and stores the conversion result in the buffer 8. For example, immediately after step S142 of FIG. 3, the first command analysis circuit 2a determines whether the number of sectors contained in the command 11 obtained from the command queue 1 is two or more. If the first command analysis circuit 2a determines that the number of sectors is two or more, it adds one to the sector number contained in the command 11 to correct the sector number. Then, the first command analysis circuit 2a performs steps S141 and S142 on the corrected sector number. This process is repeated for the number of sectors. Alternatively, the location information conversion unit may perform a conversion process on only the first sector number in step S14 of FIG. 2 and repeat a conversion process on the remaining sector numbers in FIG. 4. Thus, if one access command is targeted for multiple sector numbers, the first command analysis circuit 2a does not need to extract the sector number each time. This can increase the efficiency of the conversion process.

Figure 6:
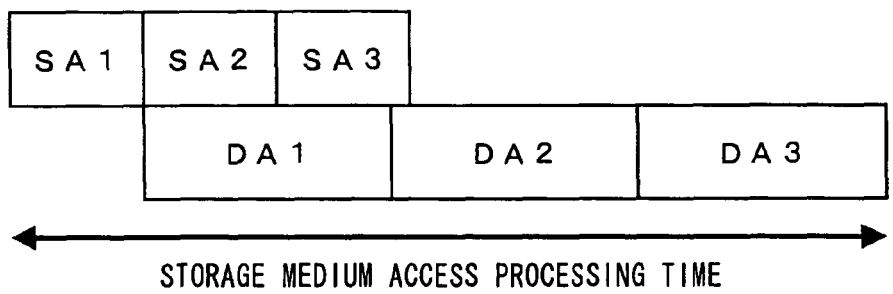
FIG. 6 is a diagram showing an advantage according to the first embodiment.
Figure 13:
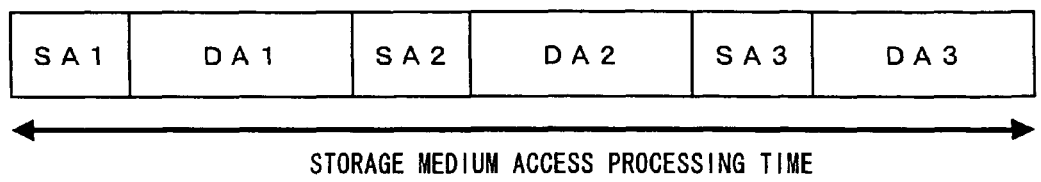
FIG. 13 is a diagram showing an issue according to a related art.

FIG. 6 is a diagram showing an advantage according to the first embodiment. FIG. 6 shows the concept of the storage medium access processing time in a case where three sector numbers are accessed in a single access process. The location information conversion unit performs the AES process SA1 on the first sector number in step S14. Subsequently, in step S15, the location information conversion unit performs the AES processes SA2 and SA3 on the second and third sector numbers, respectively. In step S16, at least after performing the AES process SA1, the data cryptographic processing unit performs the AES processes DA1, DA2, and DA3. This allows simultaneously performing the sector number conversion process in step S15 and the data cryptographic processing process in step S16. For this reason, it can be said that the storage medium access processing time becomes shorter than that of FIG. 13. As seen, the cryptographic processing apparatus 100 according to the first embodiment increases the performance of the storage medium access process.

Second Exemplary Embodiment

A second embodiment of the present invention is a modification of the first embodiment. The location information conversion unit according to the second embodiment performs a conversion process on location information corresponding to unprocessed data while the data cryptographic processing unit performs no cryptography processing. Hereafter, there will be described a case where sector number conversion processes are performed when adjusting the processing order of multiple access commands to a predetermined processing order according to NCQ before storing them in the command queue 1. In other words, when adjusting multiple access commands in a predetermined processing order, the location information conversion unit obtains pieces of location information contained in the adjusted access commands, calculates conversion results by performing conversion processes on the obtained pieces of location information, and stores the calculated conversion results in the buffer 8. Then, the data cryptographic processing unit obtains the access commands in the processing order in which they have been stored in the command queue 1, obtains the conversion results corresponding to the obtained access commands, and performs data cryptography processing on pieces of data corresponding to the obtained access commands using the obtained conversion results. This increases the processing efficiency of the location information conversion unit, thereby increasing the performance of the storage medium access process.

Figure 7:
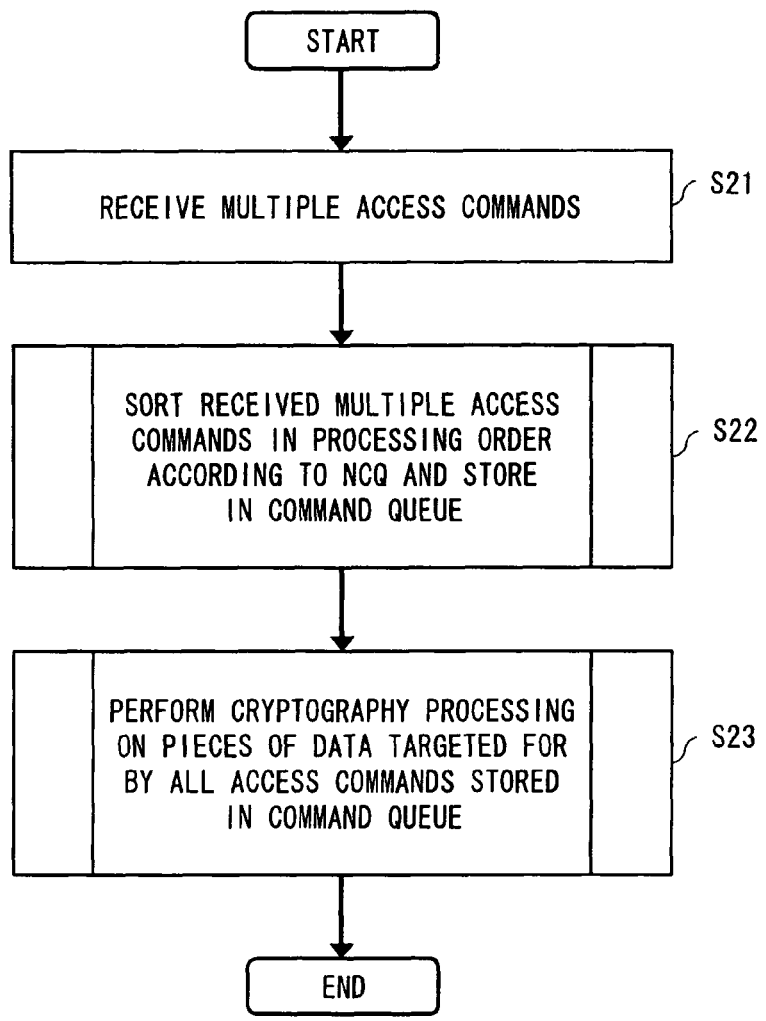
FIG. 7 is a flowchart showing the flow of the storage medium access process according to the second embodiment.

The configuration of the cryptographic processing apparatus according to the second embodiment is the same as that shown in FIG. 1 and will not be described in detail. Hereafter, the difference between the second and first embodiments will be mainly described using the reference numerals of FIG. 1. FIG. 7 is a flowchart showing the flow of the storage medium access process according to the second embodiment. First, the cryptographic processing apparatus 100 receives multiple access commands (S21). Next, the cryptographic processing apparatus 100 sorts the received multiple access commands in the processing order according to NCQ and stores them in the command queue 1 (S22).

Figure 8:
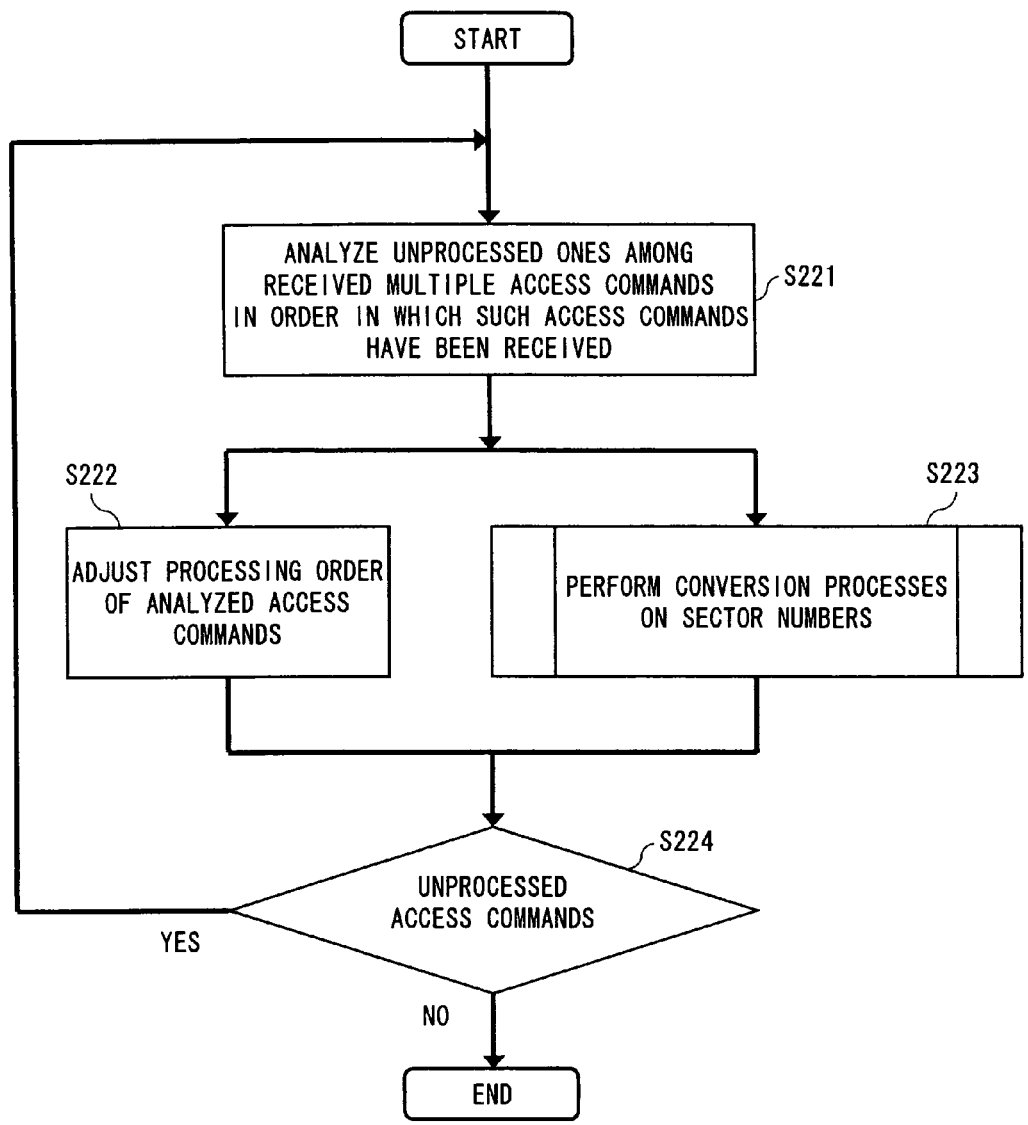
FIG. 8 is a flowchart showing the flow of the access command processing order adjustment process according to the second embodiment.

FIG. 8 is a flowchart showing the flow of the access command processing order adjustment process according to the second embodiment. First, the cryptographic processing apparatus 100 analyzes unprocessed ones among the received multiple access commands in the order in which such access commands have been received (S221). Through the analyses, the cryptographic processing apparatus 100 extracts sector numbers and the number of sectors. Then, the cryptographic processing apparatus 100 performs steps S222 and S223 simultaneously. Specifically, the cryptographic processing apparatus 100 adjusts the processing order of the analyzed access commands (S222). For example, the cryptographic processing apparatus 100 rearranges the access commands in a proper processing order according to NCQ on the basis of the analysis results of the access commands. The location information conversion unit, constituted by the first command analysis circuit 2a, AES cryptographic processing circuit 3, and multiplication circuit 4, performs conversion processes on the sector numbers contained in the analyzed access commands (S223). The sector number conversion processes are the same as that shown in FIG. 3 and will not be described.

Subsequently, the cryptographic processing apparatus 100 determines whether there remain unprocessed access commands among the received multiple access commands (S224). If it is determined that there remain unprocessed access commands, the process returns to step S221. The cryptographic processing apparatus 100 repeats steps S221 to S224 with respect to all the received access commands. If the storage medium encryption processing apparatus 100 determines in step S224 that there remain no unprocessed access commands, it performs the remainder of the access command processing order adjustment process. Thus, the received multiple access commands are stored in the command queue 1 in the order of the command 11, command 12, command 13, ... and command 1n. Also, the conversion result 81, conversion result 82, ... and conversion result 8n associated with the command 11, command 12, command 13, ... and command 1 n, respectively, are stored in the buffer 8. Accordingly, in the access process, the data cryptographic processing unit can perform data cryptography processing using the access commands stored in the command queue 1 and the conversion results stored in the buffer 8. Also, the cryptographic processing apparatus 100 analyzes the access commands in the access command adjustment process to be performed before storing them in the command queue 1. Through the analyses, the cryptographic processing apparatus 100 extracts the sector numbers contained in the access commands. Thus, the location information conversion unit can perform conversion processes on the extracted sector numbers simultaneously with the adjustment process. Accordingly, in the second embodiment, the location information conversion unit does not need to separately obtain the access commands from the command queue 1 and analyze them. This allows efficiently performing the sector number conversion process.

Figure 9:
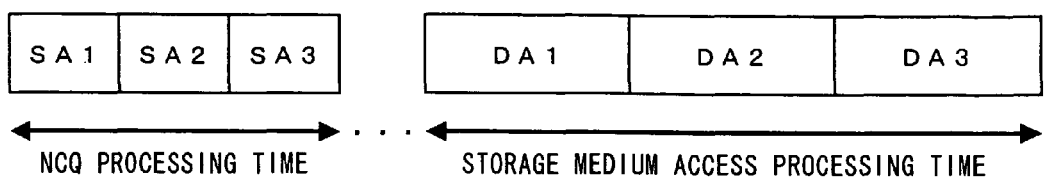
FIG. 9 is a diagram showing an advantage according to the second embodiment.

FIG. 9 is a diagram showing an advantage according to the second embodiment. FIG. 9 shows the concept of the NCQ processing time and the storage medium access processing time in a case where three sector numbers are accessed in a single access process. During the NCQ processing time, that is, in step S22 of FIG. 7, the location information conversion unit performs the AES processes SA1, SA2, and SA3 on the first, second, and third sector numbers, respectively. Subsequently, the data cryptographic processing unit performs the AES processes DA1, DA2, and DA3 during the access processing time. This eliminates the need to perform the sector number conversion process during the access Processing time, thereby distributing the load placed on the whole process that the cryptographic processing apparatus 100 performs. Thus, the performance of the storage medium access process is increased.

Third Exemplary Embodiment

A third embodiment of the present invention is a modification of the first and second embodiments. The location information conversion unit according to the third embodiment performs a conversion process on location information corresponding to unprocessed data while the data cryptographic processing unit performs no cryptography processing. Hereafter, there will be described a case where the AES cryptographic processing circuit 3 and AES cryptographic processing circuit 6 of FIG. 1 are consolidated. In other words, the location information conversion unit uses, as a conversion process, cryptography processing performed by the data cryptographic processing unit. This can restrain the circuit size.

Figure 10:
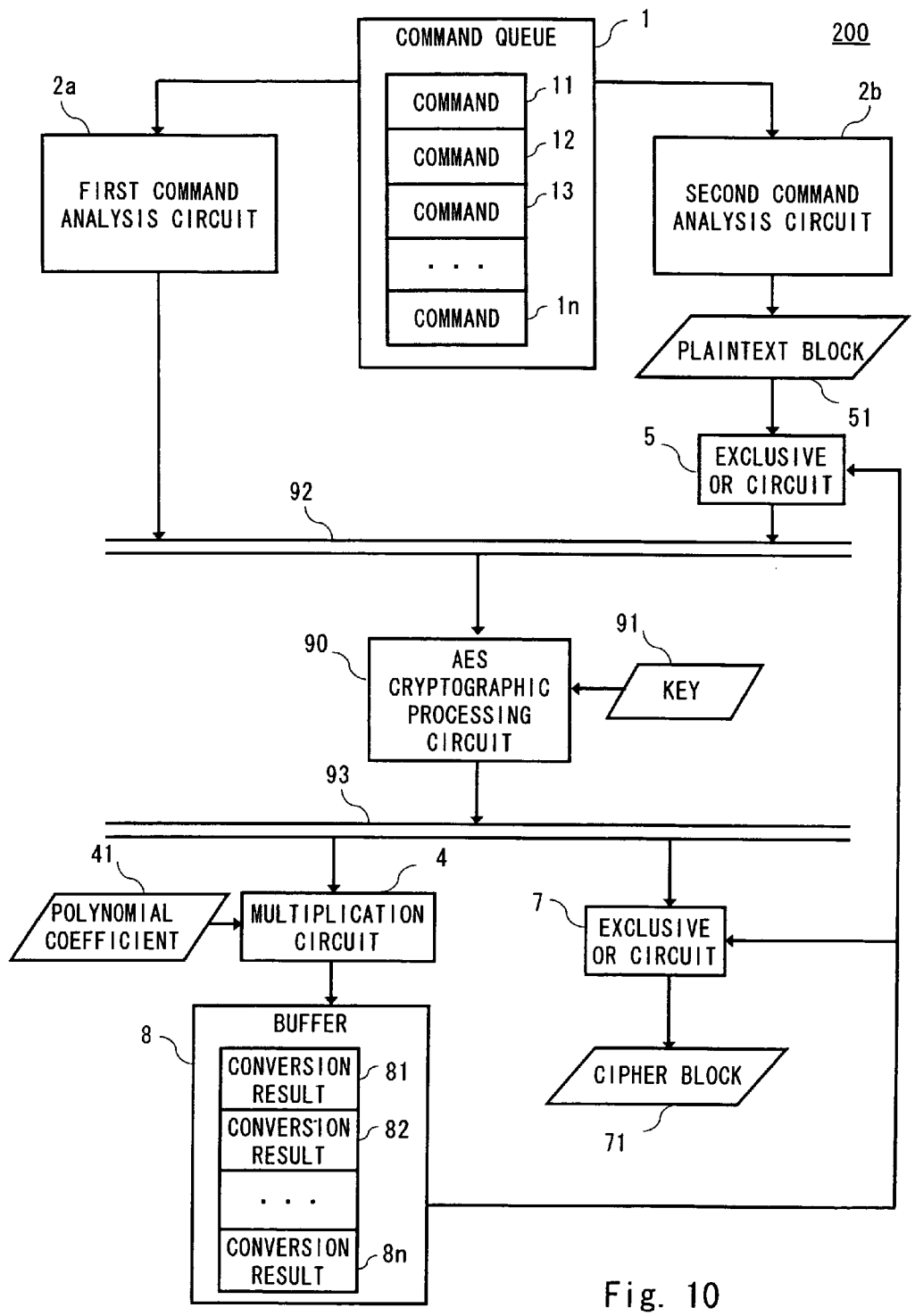
FIG. 10 is a block diagram showing a configuration of a cryptographic processing apparatus according to the third embodiment.

FIG. 10 is a block diagram showing a configuration of a cryptographic processing apparatus 200 according to the third embodiment. The cryptographic processing apparatus 200 includes the command queue 1, the first command analysis circuit 2a, the second command analysis circuit 2b, the exclusive OR circuit 5, a selector 92, an AES cryptographic processing circuit 90, a selector 93, the multiplication circuit 4, the buffer 8, and the exclusive OR circuit 7. Of the elements of FIG. 10, the same elements as those of the first embodiment are assigned the same reference numerals and will not be described in detail. Hereafter, the difference between the third embodiment and the first and second embodiments will be mainly described.

The selector 92 selects one of an input from the first command analysis circuit 2a and that from the second command analysis circuit 2b in accordance with an instruction from the cryptographic processing apparatus 200 and outputs the selected input to the AES cryptographic processing circuit 90. The AES cryptographic processing circuit 90 has functions similar to those of the AES cryptographic processing circuit 3 and AES cryptographic processing circuit 6 and performs an AES encryption process on the data received from the selector 92 using a key 91. According to an instruction from the cryptographic processing apparatus 200, the selector 93 selects one of the multiplication circuit 4 and exclusive OR circuit 7 and outputs an input from the AES cryptographic processing circuit 90 to the selected circuit.

For example, in a case where the cryptographic processing apparatus 200 functions as the location information conversion unit, the selector 92 selects the input from the first command analysis circuit 2a and outputs the sector number to the AES cryptographic processing circuit 90. Then, the AES cryptographic processing circuit 90 performs an AES encryption process on the sector number received from the selector 92 using the key 91 and outputs the encryption result to the selector 93. At that time, the selector 93 outputs the encryption result to the multiplication circuit 4. In contrast, in a case where the cryptographic processing apparatus 200 functions as the data cryptographic processing unit, the selector 92 selects the input from the second command analysis circuit 2b, that is, the operation result of the plaintext block 51 and outputs the operation result to the AES cryptographic processing circuit 90. Then, the AES cryptographic processing circuit 90 performs an AES encryption process on the operation result received from the selector 92 using the key 91 and outputs the encryption result to the selector 93. The selector 93 outputs the encryption result to the exclusive OR circuit 7.

Figure 11:
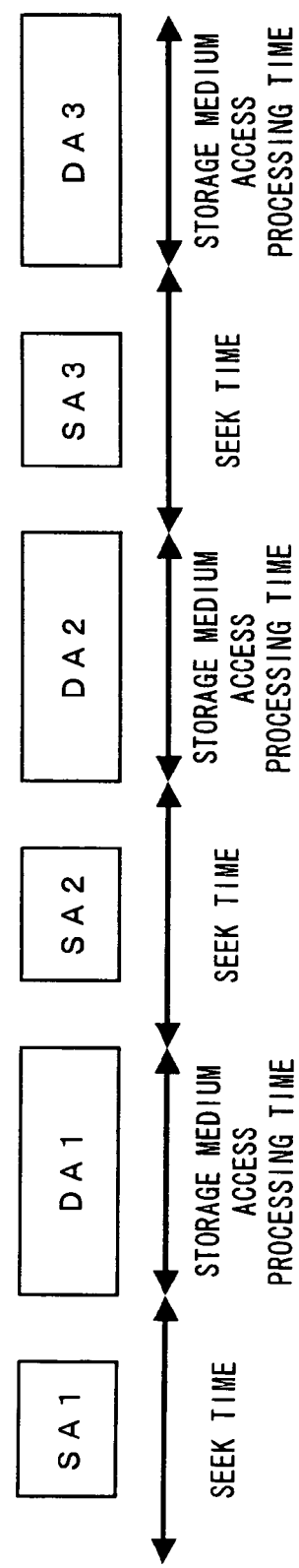
FIG. 11 is a diagram showing an advantage according to the third embodiment.

The flow of the storage medium access process according to the third embodiment may be the same as those of FIGS. 7 and 8. In this case, the circuit size can be made smaller than that of the second embodiment. Alternatively, the location information conversion process may be performed during movement of the header immediately before the storage medium access process, that is, during the seek time. An advantage in that case will be described referring to FIG. 11. FIG. 11 shows the concept of the seek times and the storage medium access processing times in a case where three sector numbers are accessed in a single access process. First, the location information conversion unit performs the AES process SA1 on the first sector number during the seek time in the first sector number access process. Then, the data cryptographic processing unit performs the AES process DA1 on the first data block during the access processing time. This can reduce the access processing time following the movement of the header. Generally, the seek time, which is required for the header to reach the storage medium, is longer than the access processing time. For this reason, the seek time can be said to be the waiting time for the storage medium access process. The third embodiment can use the waiting time effectively. Also, the third embodiment can perform the AES processes SA1, SA2, and SA3 collectively. From the above-mentioned points, there is no need to perform the sector number conversion process in the access processing time, resulting in distribution of the load placed on the whole process that the cryptographic processing apparatus 200 performs. Thus, the performance of the storage medium access process is increased.

Other Exemplary Embodiment

While the sector number is used as location information in the above-mentioned first to third embodiments, location information is not limited thereto. Also, cryptography processing is not limited to AES. Also, data to be subjected to cryptography processing is not limited to data blocks.

While an AES encryption process is used as the sector number conversion process in the above-mentioned first and second embodiments, the sector number conversion process is not limited thereto and may be performed using encryption methods other than AES. Alternatively, a hash value obtained using a hash function may be used in the sector number conversion process. That is, it is sufficient that, in the sector number conversion process, at least the value of the sector number be converted through any conversion process.

Furthermore, the present invention is not limited to the above exemplary embodiments, and various modifications can be made without departing from the gist of the present invention.

The first, second and third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A cryptographic processing apparatus for storage medium, comprising:
   a memory including a buffer;
   a location information conversion unit that stores a first conversion result in the buffer, the first conversion result obtained by performing a conversion process on first location information indicating a location of first data to be accessed on the storage medium; and
   a data cryptographic processing unit that performs cryptography processing on the first data using the first conversion result stored in the buffer, the cryptography processing being one of encryption and decryption,
   wherein the location information conversion unit stores, in the buffer, a second conversion result obtained by performing a conversion process on a second location information, the second location information, corresponding to second data to be processed after the first data, is corrected in accordance with a length of the data to be accessed and
   at least while the data cryptographic processing unit performs the cryptography processing on the first data, the location information conversion unit starts a conversion process on the second location before the data cryptographic processing unit completes cryptography processing on the first data,
   wherein the location information conversion unit and the data cryptographic processing unit are stored in the memory.

2. The cryptographic processing apparatus according to claim 1, wherein, the location information conversion unit starts the conversion process on the location information corresponding to the second data during cryptography processing of the first data.

3. The cryptographic processing apparatus according to claim 1, wherein the location information conversion unit performs a conversion process on location information corresponding to unprocessed third data while the data cryptographic processing unit performs no cryptography processing.

4. The cryptographic processing apparatus according to claim 3, wherein the location information conversion unit uses, as the conversion process, cryptography processing performed by the data cryptographic processing unit.

5. The cryptographic processing apparatus according to claim 1, further comprising:
   a storage unit, and
   an adjustment unit that adjusts a processing order of a plurality of access commands to a predetermined processing order and stores the access commands in the storage unit, wherein:
   when adjusting the processing order of the access commands to the predetermined processing order, the location information conversion unit obtains pieces of location information contained in the access commands, calculates conversion results by performing conversion processes on the obtained pieces of location information, and stores the calculated conversion results in the buffer, and
   the data cryptographic processing unit obtains, in the predetermined processing order, the access commands stored in the storage unit, obtains conversion results corresponding to the obtained access commands from the buffer, and performs cryptography processing on pieces of data targeted for by the obtained access commands using the obtained conversion results,
   wherein the adjustment unit is stored in the memory.

6. The cryptographic processing apparatus according to claim 5, wherein the adjustment unit determines a processing order of the access commands so that a moving distance of a header to the storage medium is minimized and stores the access commands in the determined processing order in the storage unit.

7. The cryptographic processing apparatus according to claim 1, wherein the location information conversion unit uses, as the conversion process, cryptography processing performed by the data cryptographic processing unit.

8. The cryptographic processing apparatus according to claim 1, wherein the location information conversion unit uses, as the conversion process, cryptography processing performed by the data cryptographic processing unit.

9. A cryptographic processing method for storage medium comprising:
   storing a first conversion result in a buffer, the first conversion result obtained by performing a conversion process on first location information indicating a location of first data to be accessed on the storage medium;

performing cryptography processing on the first data using the first conversion result stored in the buffer, the cryptography processing being one of encryption and decryption;

storing, in the buffer, a second conversion result obtained by performing a conversion process on a second location information, the second location information, corresponding to second data to be processed after the first data, is corrected in accordance with a length of the data to be accessed; and at least while performing the cryptography processing on the first data, starting a conversion process on the second location information before completing the cryptography processing on the first data.

10. The cryptographic processing method according to claim 9, wherein in the storing of the conversion result, the location information is corrected in accordance with a length of the data to be accessed, and a conversion result obtained by performing a conversion process on the corrected location information is stored in the buffer.

11. The cryptographic processing method according to claim 9, wherein in the storing of the conversion result, at latest before cryptography processing on first data is completed, a conversion process is started on location information corresponding to second data to be processed after the first data.

12. The cryptographic processing method according to claim 11, the conversion process is started on the location information corresponding to the second data during cryptography processing of the first data.

13. The cryptographic processing method according to claim 9, wherein the cryptography processing is used as the conversion process.

14. A cryptographic processing apparatus comprising:

a memory including a buffer;

a command queue that stores a plurality of commands, each command including a sector number to be accessed and a data block to be accessed;

a location information conversion unit that reads a first command from the command queue, extracts a first sector number from the first command, performs a conversion process on the first sector number, and stores a first conversion result of the first sector number in the buffer; and a data cryptographic processing unit that reads the first command from the command queue, extracts a first data block from the first command, reads the first conversion result from the buffer based on the first command, and performs cryptographic processing on the first data block based on the first conversion result, wherein the location information conversion unit stores, in the buffer, a second conversion result obtained by performing a conversion process on a second location information, the second location information, corresponding to second data to be processed after the first data, is corrected in accordance with a length of the data to be accessed, wherein the location information conversion unit starts a conversion process on a second sector number which corresponds to a second data block to be processed after the first data block, at least while the data cryptographic processing unit performs the cryptography processing on the first data block and before the data cryptographic processing unit completes cryptography processing on the first data, wherein the location information conversion unit and the data cryptographic processing unit are stored in the memory.

15. The cryptographic processing apparatus according to claim 14, wherein the data cryptographic processing unit reads the commands from the command queue independently of reading of commands from the command queue by the location information conversion unit.

16. The cryptographic processing apparatus according to claim 14, wherein the location information conversion unit corrects the sector number in accordance with a length of the data block to be accessed and stores, in the buffer, a conversion result obtained by performing a conversion process on the corrected sector number.

17. The cryptographic processing apparatus according to claim 14, wherein the location information conversion unit performs a conversion process on a sector number corresponding to unprocessed data while the data cryptographic processing unit performs no cryptography processing.

* * * * *